United States Patent
Gnanasekaran et al.

(10) Patent No.: US 12,526,227 B2
(45) Date of Patent: Jan. 13, 2026

(54) METHOD FOR REDIRECTING DATA PACKET TO REDUCE PERFORMANCE IMPACT ON LINK OFFLINE

(71) Applicant: Avago Technologies International Sales Pte. Limited, Singapore (SG)

(72) Inventors: Sathish K. Gnanasekaran, Sarjapura (IN); Pushpanathan Chidambaram, Fremont (IN); Chao Zhang, Saratoga, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/649,634

(22) Filed: Apr. 29, 2024

(65) Prior Publication Data

US 2025/0337678 A1    Oct. 30, 2025

(51) Int. Cl.
*H04L 45/28* (2022.01)
*H04L 45/42* (2022.01)

(52) U.S. Cl.
CPC .............. *H04L 45/28* (2013.01); *H04L 45/42* (2013.01)

(58) Field of Classification Search
CPC ................................. H04L 45/28; H04L 45/42
See application file for complete search history.

(56) References Cited

U.S. PATENT DOCUMENTS

| | | | | |
|---|---|---|---|---|
| 6,032,194 A * | 2/2000 | Gai | ......................... | H04L 45/28 709/224 |
| 2006/0171302 A1* | 8/2006 | Tallet | .................. | H04L 41/0663 370/225 |
| 2008/0020759 A1* | 1/2008 | Nagarajan | ............... | H04W 8/12 455/433 |
| 2008/0068985 A1* | 3/2008 | Mieno | ..................... | H04L 12/66 370/217 |
| 2008/0112311 A1* | 5/2008 | Hariharan | ............... | H04L 49/50 370/244 |
| 2009/0296697 A1* | 12/2009 | Reilly | .................... | H04L 49/552 370/357 |
| 2011/0010560 A1* | 1/2011 | Etchegoyen | ......... | G06F 11/2025 714/E11.073 |
| 2012/0204058 A1* | 8/2012 | Yuan | .................... | H04L 41/0663 714/E11.073 |
| 2017/0214566 A1* | 7/2017 | Sufleta | ................ | H04L 41/0654 |
| 2021/0194724 A1* | 6/2021 | Lee | ...................... | H04J 14/0283 |
| 2023/0185567 A1* | 6/2023 | Rojas Fonseca | ....... | G06F 8/656 717/169 |
| 2024/0073158 A1* | 2/2024 | Agrawal | ............. | H04L 45/7453 |

* cited by examiner

*Primary Examiner* — Chris Parry
*Assistant Examiner* — Dixon F Dabipi
(74) *Attorney, Agent, or Firm* — Quarles & Brady LLP (57) ABSTRACT

A method for redirecting data packet on link offline in a network is provided. The method includes detecting an offline link between a first port and a destination port. The method also includes moving the first port to a recovery state by turning on a mirroring feature to make copies of all subsequent frames of data packets to the first port. The method further includes activating a redundant port profile associated with the mirroring feature prepopulated with information including at least a second port linked to the destination port. Furthermore, the method includes forwarding, based on the redundant port profile, the copies of all data packets to the second port linked to the destination port.

12 Claims, 6 Drawing Sheets

| Maximum possible number of packet (2048B) drops under the subject technology | | | | | | | | | | | | | | |
|---|---|---|---|---|---|---|---|---|---|---|---|---|---|---|
| | Link Speed | | | | | | | | | | | | | |
| Link distance In Meters | | 1G | 2G | 4G | 8G | 10G | 16G | 25G | 32G | 40G | 50G | 64G | 100G | 128G |
| 100 | | 1 | 1 | 1 | 1 | 1 | 1 | 1 | 1 | 2 | 2 | 2 | 4 | 4 |
| 500 | | 1 | 1 | 1 | 2 | 2 | 3 | 4 | 5 | 7 | 8 | 9 | 16 | 17 |

FIG. 6

METHOD FOR REDIRECTING DATA PACKET TO REDUCE PERFORMANCE IMPACT ON LINK OFFLINE

FIELD OF INVENTION

The subject technology is directed to network links for data communication.

BACKGROUND OF THE INVENTION

A link between two network devices can go offline due to hardware failure, upper-level software actions or explicit user actions. Devices upstream to the downed link continue to forward packets until the upstream devices receive notification of the downed link and remove the downed link from the forwarding tables. The link offline event propagation and reaction (updating routing tables to use a different path) is typically done through software coordination. The time taken for this operation can be anywhere from 10s of milliseconds to 100s of milliseconds. The packets forwarded to the downed link for transmission during this time are dropped. This results in a significant number of packet drops, upper-layer protocol (ULP) retries and severe performance degradation. Therefore, a method and system for redirecting data packets to reduce impact due to network link offline are desired.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

The subject technology provides a solution for reducing impact of network link offline by redirecting the data packets from the offline port to redundant paths. The solution involves detection of a link offline condition in the data plane and forwarding all subsequent packets to a redundant path to the same destination. This limits the number of dropped packets to in-flight packets at link offline. The offline port continues in this redirect mode till reset. The reset is to be done only after the upstream devices have completed the routing table update. There are additional embodiments as well.

Network links going offline is an impactful event during which a significant number of packets are dropped. The extent of the packet drop depends on the time taken by various layers of the network stack to detect, propagate and react to the event in addition to other factors. The number of packet drops is proportional to the time taken for propagation of the link offline event to upstream devices and updating of routing table. This in turn may depend on the distance (or number of hops) of the upstream ports relative to the downed link and processing capability of the upstream devices. The number of packet drops is also proportional to the load offered for transmission to the downed port. The offered load can be even greater than the bandwidth capacity of the link due to fan-in from multiple sources and/or higher speed upstream sources. There is no theoretical upper limit for this. Additionally, the number of packet drops due to link offline is proportional to the packet size. For a given offered load, smaller packet sizes will result in more packet drops. The actual performance impact due to packet drops depends on the number of flows that were affected, in addition to the number of packet drops since each flow needs to go through the recovery protocol to reestablish the workloads.

Theoretical estimate of packet drops due to link offline for a given link speed, packet size, reaction time for traffic from single source can be obtained. The number of packet drops is 5040 (packet size 2048B) for 8 G offered load with 10 ms reaction time. If the offered load is increased to 256G, the number of packet drops can be 125237 for 10 ms reaction time. If the reaction time is slower, e.g., 100 ms, the number of packet drops will be increased to 1252371. If the packet size is only 64 B, the number of packet drops will be as large as 85685 for 8 G offered load and 10 ms reaction time, or as significant as 212903225 for 256 G offered load and 1000 ms reaction time.

Figure 1:
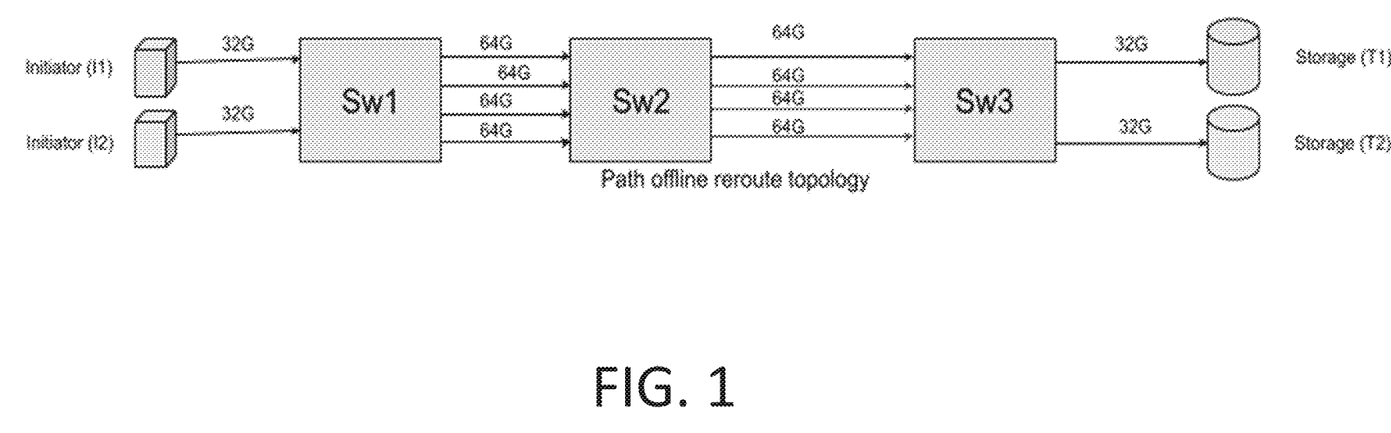
FIG. 1 is a sample schematic diagram of network links and their speeds for workload initiators, switches, and storages as data destinations.

Performance impact on end devices is generally more severe than the theoretical calculations because of overhead and delays in the recovery protocol on packet loss. In this test environment, SCSI I/O over fibre channel network is run. FIG. 1 is a schematic diagram of network links and their speeds for workload initiators, switches, and storages as data destinations. There are two initiators #1 and #2 that can respectively send IOs with 32G offered load to first switch Sw1. There are three switches in the network path, Sw1, Sw2, and Sw3, that are interconnected through 64 G speed network links. Two storages T1 and T2 are destinations of the data packets. In an example, workload initiator #1 writes data to storage #1 and initiator #2 writes data to storage #2. Workloads are write-only IOs of 64 KB including 4 MB testing area and 4 IO threads. A network link is taken offline to measure the impact of performance on the workload. In a test scenario, link offline is occurred between Sw1 and Sw2 with on hop away. The test measurement shows that total traffic throughput (across both flows) dropped from 6000 MB/s to 5500 MB/s and IO/s from 100 k to 85 k due to packet drops on link offline. It takes approximately more than 1 minute to recover the throughput and IO/s back to pre-failure levels. In another test scenario, link offline is occurred between Sw2 and Sw3 (two hops away). The test measurement shows that total traffic throughput (across both flows) dropped from 6000 MB/s to 3500 MB/s and IO/s down from 100 k to 55 k due to packet drops on link offline. It takes approximately more than 1 minute to recover the throughput and IO/s back to pre-failure levels.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

One general aspect of the subject technology includes a method for redirecting data packet on link offline in a network. The method also includes detecting an offline link between a first port and a destination port. The method also includes moving the first port to a recovery state by turning on a mirroring feature to make copies of all subsequent frames of data packets to the first port. The method also includes activating a redundant port profile associated with the mirroring feature prepopulated with information including at least a second port linked to the destination port. The method also includes forwarding, based on the redundant port profile, the copies of all data packets to the second port linked to the destination port. Other embodiments of this aspect include corresponding computer systems, apparatus, and computer programs recorded on one or more computer storage devices, each configured to perform the actions of the methods.

Implementations may include one or more of the following features. The step for detecting an offline link may include detecting in a data plane of the network including links associated with at least the first port, the second port, the destination port, and one or more upstream ports. The step for moving the first port to a recovery state may include propagating information about the offline link associated with the first port to the one or more upstream ports and updating routing tables to not sending data packets further to the first port. The step for turning on the mirroring feature may include activating the redundant port profile via a switched port analyzer in the data plane and adding an encapsulation header to each frame in the copies to form a frame of redirected packets, the encapsulation header including a code for identifying the redirected packets from the offline link. The step for forwarding the frame of redirect packets to the second port may include validating the code to identify the frame of redirected packets, removing the encapsulation header of the frame by the second port, and transmitting the frame of redirected packets to the destination port. The method may also include maintaining the first port in the recovery state until all frames of redirected packets are forwarded, moving the first port to an offline state with further state transition as needed, and deactivating the redirection mode by a control plane of the network. The first port and the second port belong to a same switch in the network. The first port and the second port belong to different switches in the network. Implementations of the described techniques may include hardware, a method or process, or computer software on a computer-accessible medium.

Another general aspect of the subject technology includes a method for redirecting data packets from an offline link in a network. The method includes receiving data packets by a first switch in the network from an initiator. The method also includes forwarding the data packets through the network to a first transmit port in a second switch, the data packets being in a transmission queue to be transmitted to a destination port. The method also includes detecting an offline state at the first transmit port. The method also includes activating packet redirection mode with a redundant port profile at the first transmit port, the redundant port profile being prepopulated with routing information for redirecting the data packets in the transmission queue through a redundant path to the destination port via a second transmit port in a third switch. The method also includes requeuing the data packets as redirect packets in a mirror queue with a header having the redundant path. The method also includes forwarding the redirect packets in the mirror queue through the network via the redundant path to the second transmit port. The method also includes identifying the redirected packets by the second transmit port based on the header. The method also includes removing the header of the redirected packets. The method also includes transmitting the redirected packets from the second transmit port to the destination port. Other embodiments of this aspect include corresponding computer systems, apparatus, and computer programs recorded on one or more computer storage devices, each configured to perform the actions of the methods.

Implementations may include one or more of the following features. The step for forwarding the data packets through the network to the first transmit port in the second switch may include using a first routing table of the first switch to forward the data packets to at least a fourth switch having a second routing table to further guide forwarding the data packets to the first transmit port in the second switch. The method may include using the first routing table of the first switch to forward the data packets to at least a fifth switch having a third routing table to further guide forwarding the data packets to the second transmit port in the third switch. The step for forwarding the redirect packets in the mirror queue through the network via the redundant path may include forwarding the redirect packets to the fifth switch based on the header, the fifth switch further forwarding the redirect data to the second transmit port in the third switch based on the third routing table. The method may include propagating the offline state at the first transmit port to all switches including the fourth switch and the fifth switch in the data plane. The method may include updating the second routing table and the third routing table, based on reception of the offline state at the first transmit port, to not forward data packets destined to the destination port further to the first transmit port in the second switch but to the second transmit port in the third switch. The method may include starting a redirect delay time to allow sufficient time for updating routing tables of all switches in the network. The method may include deactivating the redundant port profile at the first transmit port after the redirect delay time is expired. Implementations of the described techniques may include hardware, a method or process, or computer software on a computer-accessible medium.

Yet another general aspect of the subject technology includes a network for redirecting data packets during a link offline event. The network also includes a first switch configured to receive data packets from an initiator. The first switch has a first routing table indicating a destination port for the data packets. The network also includes a fourth switch configured to receive the data packets forwarded from the first switch based on the first routing table. The fourth switch has a second routing table for guiding the data packets to reach the destination port. The network also includes a fifth switch configured to receive the data packets forwarded from the first switch. The fifth switch has a third routing table for guiding the data packets to reach the destination port. The network also includes a second switch configured to receive the data packets forwarded from the fourth switch through the network based on the second routing table. The data packets are queued in a transmission queue to be transmitted via a first transmit port to the destination port, and configured to activate a redundant port profile, after the first transmit port is offline, to requeue the data packets in a mirror queue as redirect packets with a redundant path header and forward the data packets to the fifth switch based on the redundant path header. The network also includes a third switch configured to receive the redirect packets from the fifth switch based on the third routing table. The third switch may include a second transmit port configured to transmit the redirect packets to the destination port.

Implementations may include one or more of the following features. The second switch may include a control plane software implemented in an application specific integrated circuit to propagate information of the first transmit port being at the offline state to all switches in the network and command to stop data packet transmission from the first transmit port to the destination port. At least the fourth switch may include a control plane software configured to, upon receiving the information of the first transmit port being offline, update the second routing table to not further forward data packets destined to the destination port to the first transmit port of the second switch. The third switch may include a control plane software implemented in an application specific integrated circuit to check the redundant path header to identify the redirect packets being forwarded from the second switch with the first transmit port being offline, to remove the redundant path header while submitting the redirect packets as data packets in a transmission queue to the second transmit port, and to transmit the data packets to the destination port.

Figure 2:
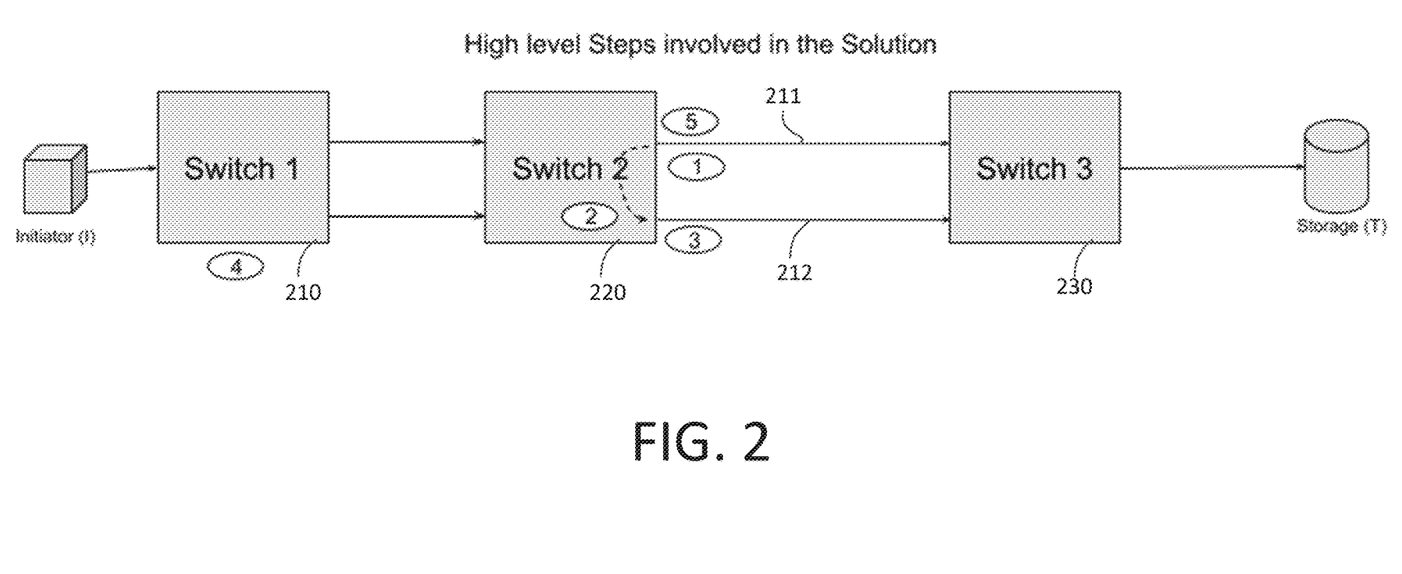
FIG. 2 is a sample schematic diagram illustrating a network configured in multiple steps to redirect data packets during network link offline according to an embodiment of the subject technology.

FIG. 2 is a schematic diagram illustrating a network configured in multiple steps to redirect data packets during network link offline according to an embodiment of the subject technology. In an embodiment, the subject technology provides a solution for substantially reduce impact of packet drops during a network link offline event. FIG. 2 shows a network configuration similar to that in FIG. 1, a workload with multiple data packets is initiated from the initiator (I) and transmitted to a first switch 210 which further sends the data packets along a network path to a second switch 220. The second switch 220 includes two transmit ports configured to transmit the data packets via two links 211 and 212 to the third switch 230. As the second switch 220 is queueing the data packets in a transmission queue to be transmitted, link 211 is detected offline for any reason. In an embodiment, the detecting an offline link comprises detecting in a data plane of the network including links associated with at least a transmit port, a redundant port, the destination port, and one or more upstream ports in different switches or routers in the network. In an embodiment, the subject technology provides a method for redirecting data packet during link offline. A first high-level step of the method is, when a link is offline, to detect the offline condition in the data plane and move the corresponding transmit port to "recovery" state. When a port is moved to the recovery state, a packet redirection is activated for subsequent frames of packets which have been already in or still arriving at the transmission queue to the corresponding transmit port. In an embodiment, this logic or the packet redirection mode is implemented in the data plane of the network since the redirection needs to take effect before the current frame transmission completes so that there are no further frame drops. In an embodiment, this detection of offline event and initiation of redirection mode can be implemented as a firmware programmed in each switch or can be executed via application specific integrated circuit (ASIC) hardware built in each switch chip.

As the packet redirection mode is initiated, a second high-level step of the method is to execute the packet redirection to a redundant path. Typically, packets are queued in the transmission queue of a port after completion of all packet processing functions except scheduling and transmission. So, the general behavior is either to transmit the packet on the link or drop the packet if the link is offline. The step of redirecting the packet to a redundant path includes queuing the packets for transmission on one port (to the link 211) to be re-forwarded to a different port (to the link 212) instead of dropping the packets when the port is detected offline. In an embodiment, the packet redirection feature can be achieved by leveraging a mirroring or SPAN (switched port analyzer) feature with some enhancements.

The SPAN feature is normally used in network administration and troubleshooting. Its primary function is to allow administrators to monitor and analyze traffic on a network by copying packets from one or more ports and forwarding them to another port, typically a diagnostic or monitoring port. The SPAN feature makes copies of packets being transmitted (or received) on a port and forwards it to a different diagnostic port for analysis. A SPAN profile is programmed with pre-calculated data plane information needed for forwarding packets to a different port thus avoiding the need for the packet to through the processing pipeline again. The SPAN profile contains data regarding the SPAN destination port along with other metadata and is used for transporting the packet to the remote port. The remote port then removes the encapsulation header and transmits the packet out on a diagnostic port.

Referring to FIG. 2 again, the second step of the method includes turning on a mirror profile or activating the redundant port profile via a switched port analyzer (SPAN) in the data plane prepopulated by the control plane of the network. The mirror profile feature makes copies of packets being transmitted (or received) on the offline port and adds an encapsulation header to each frame in the copies to form a frame of redirected packets, the encapsulation header including a unique code for identifying the redirected packets from the offline link The redundant port profile includes information needed to forward the packet (from the port associated with the offline link 211) to a different redundant port which will be an available transmit port in switch 220 leading to the same destination (via an online link 212). Specifically, the redundant port profile or mirror profile allows copies of the packets previously sent via a transmission queue to the offline port to be re-queued in a mirror queue forwarding via a redundant path to the redundant port. In an embodiment, the redundant port profile is activated by the data plane as a port/link goes offline (i.e., when the port is moved to the recovery state at the first step). In another embodiment, the redundant port profile contains a unique code to be embedded in a header of frame, i.e., encapsulation header, to identify the redirect packets. This unique code allows differentiation between regular SPAN packets for diagnostic analysis and redirected packets for reducing packet drop.

Figure 3:
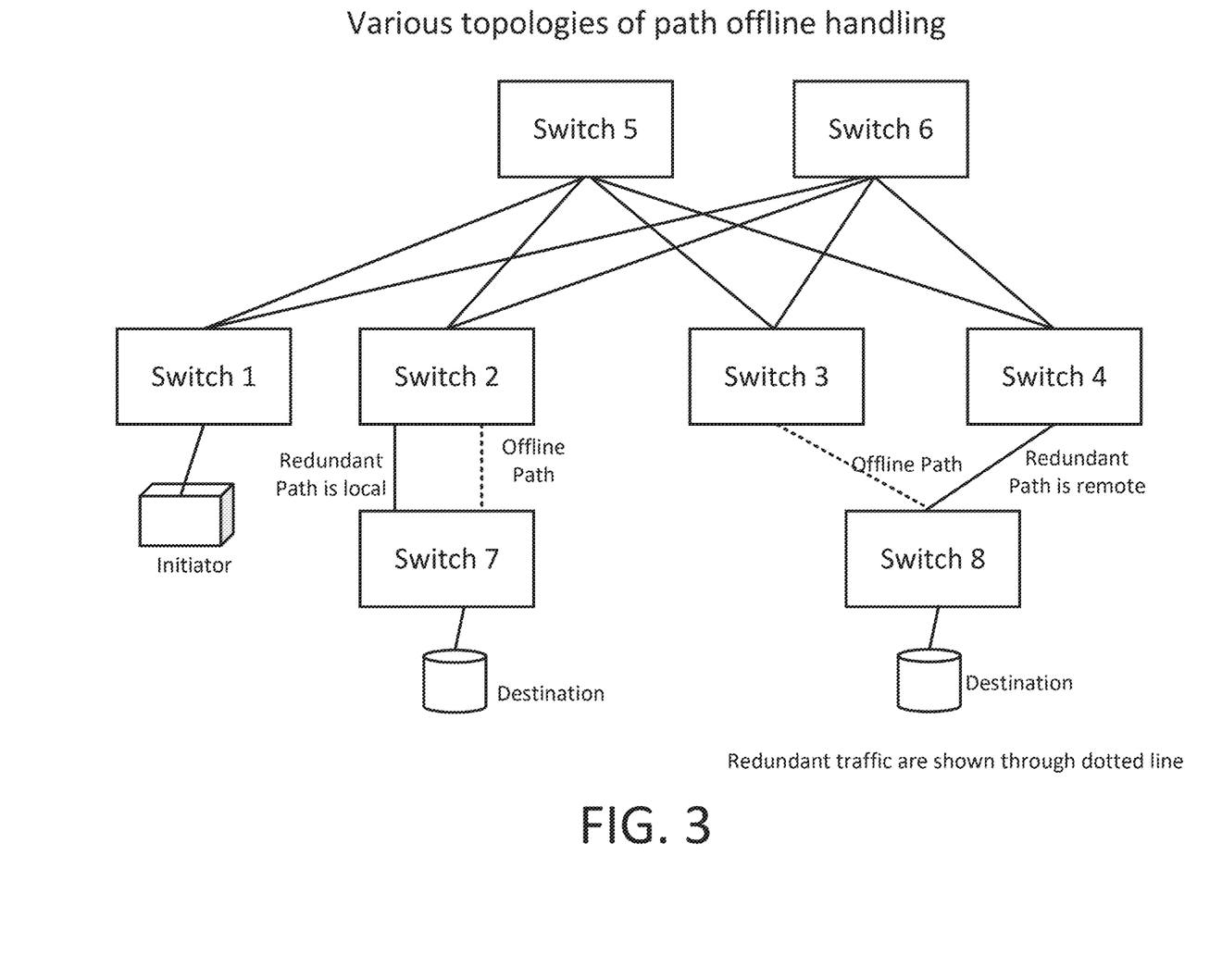
FIG. 3 is a sample schematic diagram illustrating a network with various topologies to realize redirection of data packets during network link offline according to an embodiment of the subject technology.

The method provided by the subject technology can be implemented in any network topology and works as long as at least one redundant link is available to the destination. In FIG. 2, the packets are initiated by initiator (I) and forwarded to one upper stream switch 1 before transported to switch 2. An offline path from switch 2 via link 211 to switch 3 is detected. But a redundant path via link 212 is available locally from the same switch 2 to switch 3, i.e., switch 2 has a redundant port that is able to transmit packets (redirected from the offline port) via the link 212 to switch 3. From third switch 230 the data packets can be further transported to the destination, i.e., storage (T). In FIG. 3, one network topology is similar to that in FIG. 2, where the packets initiated by the initiator are forwarded to a first switch 1 then to two other switches, switch 5 and switch 6. From (either of) switch 5 and switch 6, the packets are further forwarded to switch 2 which needs another one hop to switch 7 before reaching its destination. Under this topology, an offline path from switch 2 to switch 7 has been detected while a redundant path is found locally from a redundant port at switch 2 (via one hop) to switch 7 towards the same destination. This is preferred for packet redirection as it makes the least number of hops across switches.

Alternatively, the redundant path to a same destination may be across multiple switches/routers. FIG. 3 shows another topology where both switch 3 and switch 4 were respectively configured to transmit the packets forwarded from their upper stream switches (switch 5 and switch 6) to a down-stream switches 8 leading to a destination. In a case, an offline link between the switch 3 and switch 8 is detected. A remote link between switch 4 and switch 8 remains online. In the case, a redundant path is found to allow the packets to be redirected offline port of switch 3 via a first hop to switch 5 or switch 6, a second hop to switch 4, and a third hop via the remote link to a redundant port in switch 8 before being forwarded to the same destination. On the redundant port profile or mirror profile, the redundant port information with its location on a same or different switch and the path with one or more hops between switches in the network is pre-populated. Based on the information in the mirror profile, the redirect packets with an encapsulated header are transparently forwarded from the offline port to the redundant port through the native switch forwarding capability in the network just like forwarding a SPAN packet to a diagnostic port.

The method provided by the subject technology further includes a step to handle the data packets forwarded from the offline port which are sent via a transmission queue to the redundant port. At the same time, the transmission queue on the redundant port may have packets that were directly issued from upstream switches/routers (may be from a same or a different initiator) to it. The redundant port can distinguish these two types of data packets by reading the unique code in the encapsulation header of respective packets. Then, the redundant port is configured to remove the encapsulation header for redirected packets after validating the packet type and transmits the redirected packets in the link to the destination (e.g., storage T) along with those directly issued to it.

The method provided by the subject technology also includes a fourth step for updating all upstream devices (switches and routers) while the offline port is moved in the recovery state. This step, specifically, including propagating information about the offline event to all upstream ports that are forwarding (or may forward) packets to the offline port. In an example shown in FIG. 2, the upstream switch 210 will receive the offline event information propagated from switch 220. The routing stables for upstream ports (in switch 210) are then updated to not use the offline link 211 for forwarding data packets anymore. In another example shown in FIG. 3, the two first upper-stream switches (switch 5 and switch 6) will update routing tables for all their ports to stop forwarding data packets to the offline port in switch 3 based on offline event information propagated from the offline port in switch 3. Further, the second upper-stream switch (switch 1) also will update its routing table upon the offline event information forwarded from the offline port via the switch 5 or switch 6. This upper-stream port update stops any further forwarding of packets to the offline port.

The method further includes a fifth step for maintaining the recovery state of the offline port for sufficient time to drain all pre-forwarded and queued frames of packets. Once those frames of packets are all redirected, the offline port can be moved to an offline state. The offline state allows the port to be reconfigured for further state transitions as needed including back to an online state again for transmitting packets in designated path in the network. The fifth step, in an embodiment, leads to that the mirror profile for the offline port is deactivated at this stage by the control plane of the network.

Figure 4:
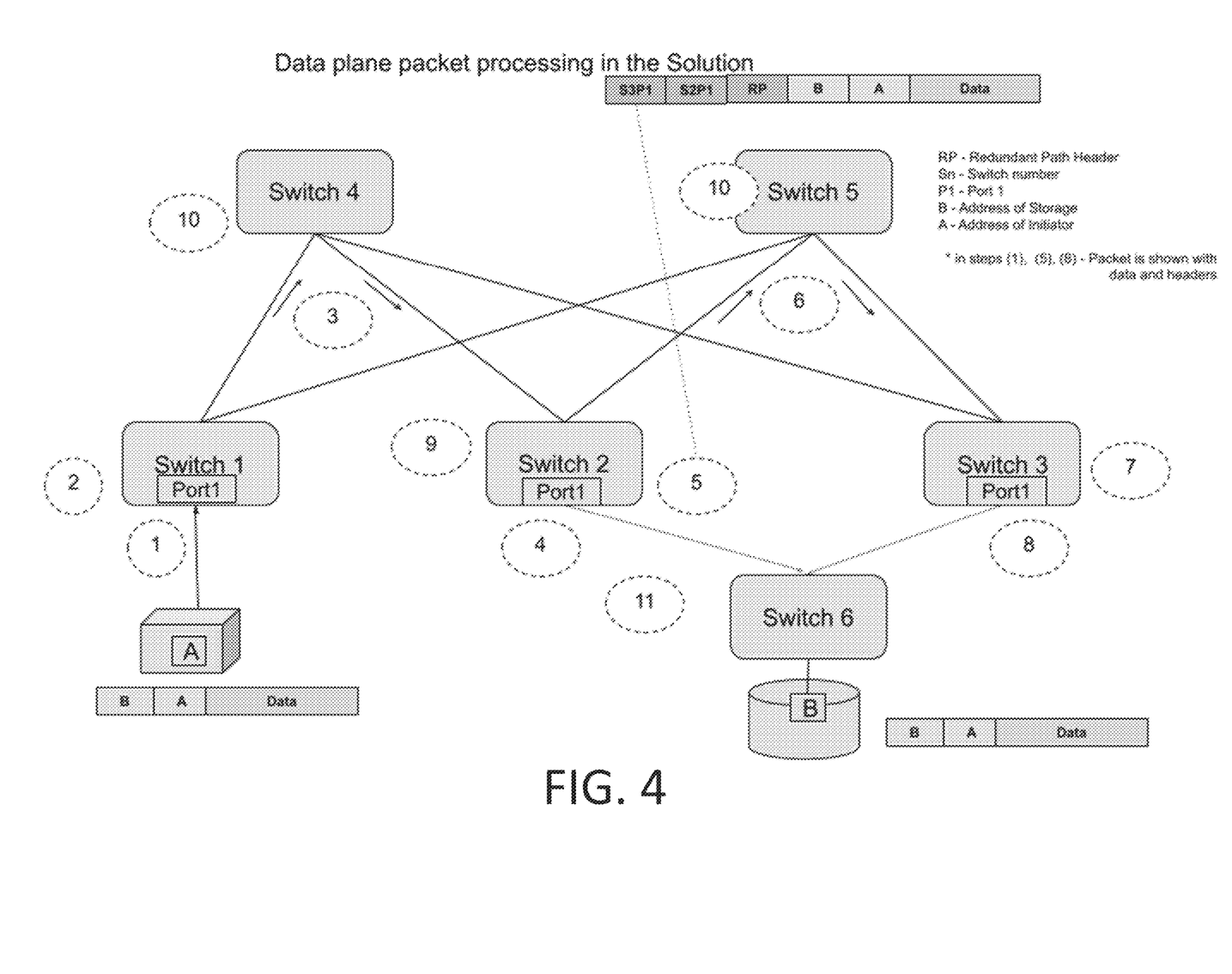
FIG. 4 is a sample schematic diagram illustrating a method with various steps to realize redirection of data packets during a network link offline according to an embodiment of the subject technology.

FIG. 4 is a schematic diagram illustrating a method with various steps to realize redirection of data packets during a network link offline according to an embodiment of the subject technology. In an example shown in FIG. 4, the method to realize redirection of data packets during network link offline is illustrated by a network setting including sixth switches to transport or route data packets from an initiator A to a destination B. A data packet was initiated by the initiator A with a header including information of the initiator A itself, the destination B followed by the data. Step 1: Port 1 of Switch 1 receives the packet from initiator A. Network switch, especially for layer 3 switches, can have a routing table that guides it in transporting data packets to their destinations. A routing table contains information about the topology of the network and guides the switch in determining the best path for forwarding data packets to their intended IP addresses. The routing table lists all known network components and possible paths, provides the address of next hop (to next switch in the path) and the interface through which to forward the packet. Step 2: Switch 1 uses a routing table to forward the packet to Switch 4 and Switch 5; Step 3: Switch 4 further forwards the data packet through the network to port 1 of Switch 2, where the data packet was in a transmission queue to be transmitted to a final destination B via Switch 6. Optionally, the packet was forwarded by Switch 4 in the network to reach the final destination B via Switch 3 and Switch 6.

Referring to FIG. 4, the method further shows a Step 4: detecting an offline state at the port 1 of Switch 2. The port 1 through which the packet leaves a network device (Switch 2) to reach another network device (Switch 6) is not operational due to a failure, maintenance, or another reason. The physical layer block of the Switch 2 detects that port 1 is offline, it signals an offline state to the transmission block of Switch 2. A packet redirection mode is turned on and a redundant port profile or mirror profile is activated. For each packet in the transmission queue (which was intended to be transmitted to Switch 6), the following signals are triggered: REDUNDANT_REDIRECT, which requeues the packet for mirror (copy and forward) action; PORT_OFFLINE, which causes packet to be not transmitted on the offline (downed) port 1. The method further leads to Step 5: the REDUNDANT_REDIRECT action puts a copy of the packet in the transmission queue to the port 1 of Switch 2 to a mirror queue. This action activates a packet redirection mode with a redundant port profile at the port 1 prepopulated with routing information for redirecting the data packet. This leads to an addition to a packet header, on top of original information like initiator address, destination address, and the data, with a redundant path including mirroring/SPAN routing information, e.g., switch and port numbers for all switches along the redundant path. The method of the subject technology executes a Step 6: forwarding the mirror queue through the network to the redundant path based on the routing information in the redundant path header. Referring to FIG. 4, the packet is redirected from the port 1 of Switch 2 to Switch 5 based on routing table in Switch 2 as well as the S2P1 and RP values in the redundant path header.

Referring to FIG. 4, the method further shows a Step 7: the packet in the mirrored queue further is forwarded from Switch 5 to reach the final redundant path, i.e., port 1 of Switch 3 based on routing table in Switch 5 as well as S3P1 value in the redundant path header. This is followed by execution of Step 8: checking the packet header by the port 1 of Switch 3 on whether the packet is with the redundant path header, removing the redundant path header after validating it, and transmitting out via port 1 of Switch 3 (treating the packet in the mirror queue the same way as other packets in regular transmission queue). Referring to FIG. 4, the packet is transmitted from Switch 3 to Switch 6 from which it finally reaches the destination B and stored as a packet with the same header information followed by the data as the packet originally initiated by the initiator A.

Referring to FIG. 4 again, as Switch 2 is executing Step 5 associated with the REDUNDANT_REDIRECT action, Switch 2 also is executing Step 9 associated with a PORT_OFFLINE action to allow control plane software on Switch 2 propagates the information about the offline state (transmission of the data packet from port 1 Switch 2 is failed due to an offline link to the down-stream Switch 6) to all switches in the network. These switches include two up-stream switches, Switches 4 and 5, of Switch 2 as well as one up-stream switch, Switch 1, of the Switches 4 and 5. A redirect delay timer is started to allow sufficient time for routing table update. In an embodiment, the method includes a Step 10: routing table update action is done by the control plane software on every up-stream switch based on reception of information about the offline state to not further forward data packets destined to the destination B to port 1 of Switch 2, this will avoid further packet drops. In an embodiment, routing table update in some up-stream switches located in the redundant path will enable forwarding the redirected packet to the port 1 of Switch 3, which leads to the destination B via Switch 6. Now data traffic destined to B (via Switch 6) is forwarded only through Switch 3.

In an embodiment, the method includes a Step 11: as the redirect delay timer expires for the offline Switch 2 port 1 in the recovery state, the redundant port profile is deactivated on Switch 2 port 1 and the port 1 is subsequently transitioned to an offline state. The offline state allows the port to be back online if necessary.

Figure 5:
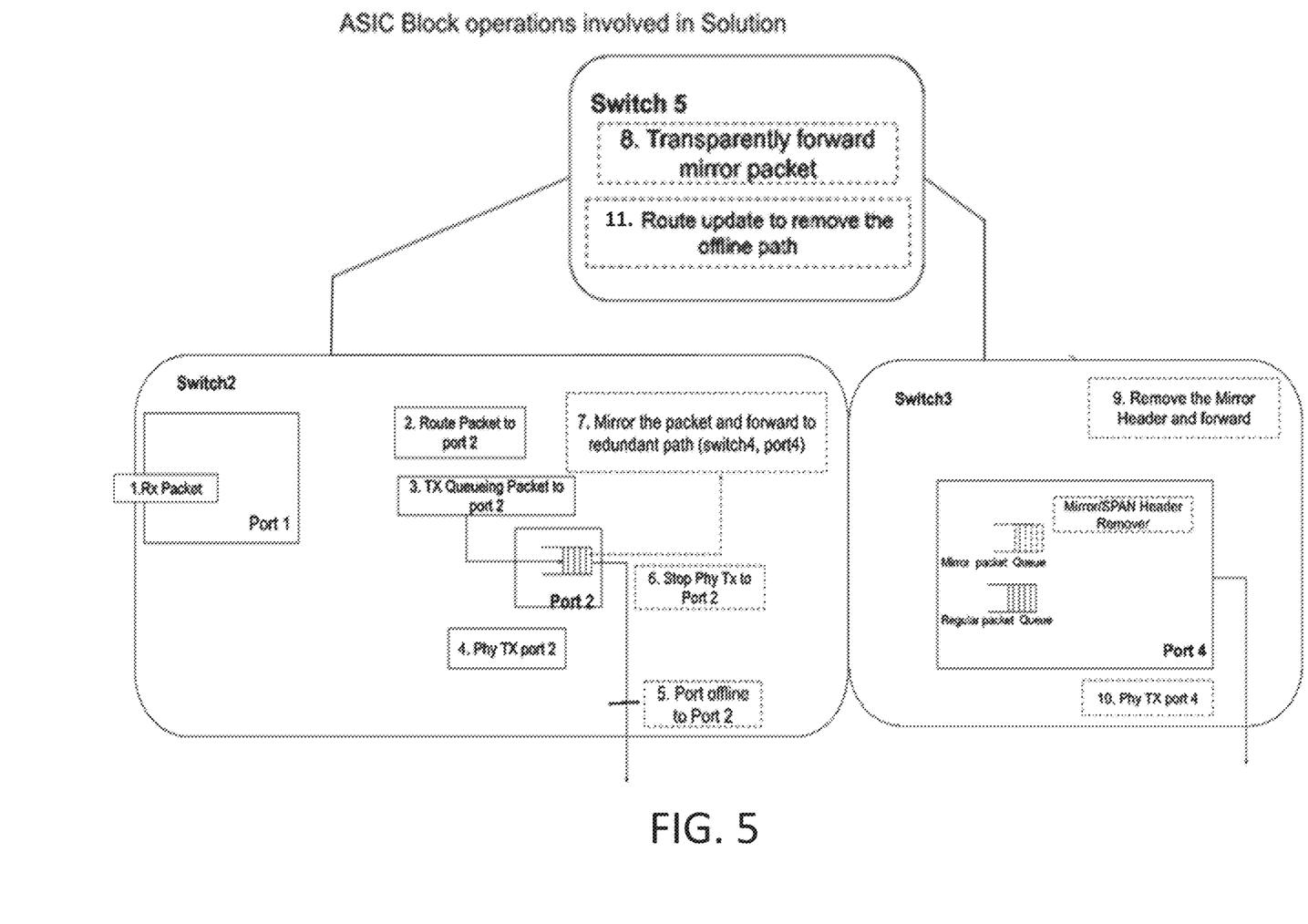
FIG. 5 is a sample schematic diagram illustrating various ASIC functional blocks in the network switches to support redirection of data packets during a network link offline according to an embodiment of the subject technology.

FIG. 5 is a schematic diagram illustrating various ASIC functional blocks in the network switches to support redirection of data packets during a network link offline according to an embodiment of the subject technology. In an embodiment, Switches 2, 3, and 5 in FIG. 5 are substantially configured to use application specific integrated circuit (ASIC) blocks to perform same logic functions implemented as control plane software in the Switch 2, 3, and 5 in the network shown in FIG. 4. In a specific embodiment, a first logic ASIC block in Switch 2 is configured to receive a data packet at port 1. A second logic ASIC block is configured to route the packet based on the routing table of Switch 2 to port 2. The packet is queued into a transmission queue to the port 2 driven by a third logic ASIC block. Next step, a fourth ASIC block is configured to drive physical transmission of the packet in the transmission queue (out to its destination determined by the routing information in a prepopulated header of the packet). In a scenario shown in FIG. 4 and FIG. 5, during the transmission, a port offline event for the port 2 is detected by a fifth ASIC block.

Upon the occurrence of the port offline event, new ASIC block, the sixth logic ASIC block, is added to perform a logic function to stop the physical transmission of the packet via port 2. The port offline event triggers the port 2 into a recovery state. Subsequently, a seventh logic ASIC block is added to enable a mirroring feature which makes a copy of the packet and forward it to a redundant path. For example, the redundant path includes Switch 3 port 4 that leads the packet to a same destination as Switch 2 port 2 in the example of FIG. 5. The seventh logic ASIC block is configured to add an encapsulated mirror header including the redundant path and associated routing information to the packet that failed in transmission at the port 2 to form a redirect packet. The mirror header includes a unique code that can distinguish the redirect packet from other packets that are directly forwarded by the upper-stream switches. Additionally, the redundant path may include an upper-stream switch, Switch 5, to provide one additional hop between different switches in the network to transport the redirect packet via a mirror queue to the destination. An existing eighth logic ASIC block is configured to transparently forward the redirect packet in the mirror queue to Switch 3 based on routing table in Switch 5.

Upon receiving the redirect packet from Switch 5, port 4 of Switch 3 includes a ninth logic ASIC block to execute a logic function to, firstly, validate the packet is a redirect packet by checking the unique code in the mirror header added by the seventh logic ASIC block performed in Switch 2. Secondly, the ninth ASIC block performs a logic function to remove the mirror header (while keep all other routing information in the header of the packet) and forward the packet according to the routing information remained in the header which includes destination address. In an embodiment, the redirect packet now is turned to a regular packet like others in the transmission queue of the port 4 in Switch 3. Then, a tenth ASIC block in Switch 3 would drive a physical transmission of the packet to its destination, which would be the same destination intended for transmitting via port 2 of Switch 2 originally but failed due to the port 2 offline event.

Associated with the upper-stream switch, Switch 5, an eleventh ASIC block is configured to perform a logic function to update routing information for Switch 5 to remove the offline path associated with port 2 of Switch 2. This ASIC block should be included in all switches in the network, which allows that there are no further packets being forwarded to port 2 of Switch 2 as the port 2 has been in the recovery state and physical transmission via port 2 is stopped.

Figure 6:
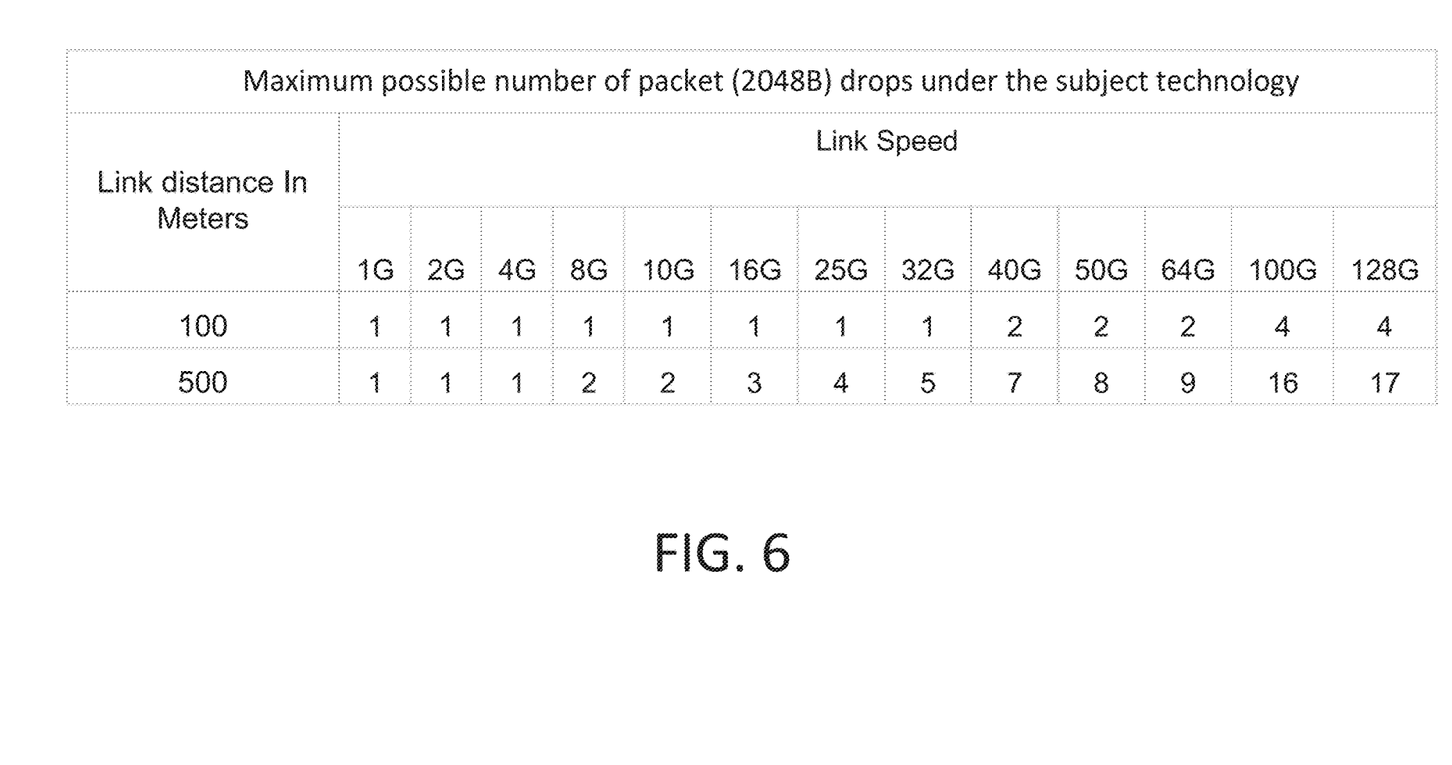
FIG. 6 is a table illustrating the number of packets drops according to an embodiment of the subject technology.

FIG. 6 is a table illustrating the number of packets drops according to an embodiment of the subject technology. With the implementation of the method for redirecting packets from offline link to redundant path according to embodiments of the subject technology, the number of packets dropped is limited to the number of in-flight packets at the link offline time. For example, assuming link speed is 1G, only one in-flight packet (size 2048B) drops for link distance of 100 meters or even 500 meters. For link speed of 64G, the number of in-flight packet drops are only 2 for link distance of 100 meters and 9 for link distance of 500 meters. Other examples for different speeds and typical distances are shown in the table. For longer distances, even though not common, the inflight packets will be higher (few hundreds). In any case, the packet drops will be significantly lower with the solution provided by the subject technology.

Simulation tests are done to quantify the expected improvement with this solution to collect performance data with artificially induced packets drops on a network link. The number of packets dropped is inline with what is expected with this solution. In an example, the packet drops on link one hop away from source device is tested, which shows that total traffic throughput is staying on par with maximum input/output bandwidth. In another example, the packet drops on link two hops away from source device is tested, which shows that total traffic throughput is dropping and being recovered within a few seconds.

In an alternative embodiment, the in-flight packets in the frame under transmission at the link offline time may also be forwarded to the alternate path, thus reducing the packet drops even further. In this approach, the frame under transmission during a link offline time can be treated as frame with cyclic redundancy check (CRC) error (the calculated checksum of a data frame doesn't match the checksum received with the frame). Frames with CRC errors are handled by the transmitter and receiver using the EOF (end of frame) mechanism. Such frames are dropped by the receiver, if received. The frame under transmission is also redirected to the redundant path. This method ensures that the valid packet is transmitted only once and there are no duplicate transmissions. Note that frames that have been transmitted fully but still in flight due to long link distance will still be dropped. In another alternative embodiment of the subject technology, the redundant port profile can be programmed with multiple redundant ports instead of just one port. This allows distribution of traffic originally destined for the downed port to be distributed across other available ports. This can avoid potential congestion on a redundant port caused by redirection of all traffic from the downed link to a single redundant port.

While the above is a full description of the specific embodiments, various modifications, alternative construc-

What is claimed is:

1. A method for redirecting data packets from an offline link in a network comprising:
   receiving data packets by a first switch in the network from an initiator;
   forwarding the data packets through the network to a first transmit port in a second switch, the data packets being in a transmission queue to be transmitted to a destination port, using a first routing table of the first switch to forward the data packets to at least a fourth switch having a second routing table to further guide forwarding the data packets to the first transmit port in the second switch;
   detecting an offline state at the first transmit port;
   activating packet redirection mode with a redundant port profile at the first transmit port, the redundant port profile being prepopulated with routing information for redirecting the data packets in the transmission queue through a redundant path to the destination port via a second transmit port in a third switch;
   requeuing the data packets as redirect packets in a mirror queue with a header having the redundant path;
   forwarding the redirect packets in the mirror queue through the network via the redundant path to the second transmit port;
   identifying the redirected packets by the second transmit port based on the header;
   removing the header of the redirected packets; and
   transmitting the redirected packets from the second transmit port to the destination port.

2. The method of claim 1, comprising using the first routing table of the first switch to forward the data packets to at least a fifth switch having a third routing table to further guide forwarding the data packets to the second transmit port in the third switch.

3. The method of claim 2, wherein forwarding the redirect packets in the mirror queue through the network via the redundant path comprises forwarding the redirect packets to the fifth switch based on the header, the fifth switch further forwarding the redirect data to the second transmit port in the third switch based on the third routing table.

4. The method of claim 2, further comprising propagating the offline state at the first transmit port to all switches including the fourth switch and the fifth switch in the data plane.

5. The method of claim 4, comprising updating the second routing table and the third routing table, based on reception of the offline state at the first transmit port, to not forward data packets destined to the destination port further to the first transmit port in the second switch but to the second transmit port in the third switch.

6. The method of claim 5, comprising starting a redirect delay time to allow sufficient time for updating routing tables of all switches in the network.

7. The method of claim 6, comprising deactivating the redundant port profile at the first transmit port after the redirect delay time is expired.

8. A network for redirecting data packets during a link offline event comprising:
   a first switch configured to receive data packets from an initiator, the first switch having a first routing table indicating a destination port for the data packets;
   a fourth switch configured to receive the data packets forwarded from the first switch based on the first routing table, the fourth switch having a second routing table for guiding the data packets to reach the destination port;
   a fifth switch configured to receive the data packets forwarded from the first switch, the fifth switch having a third routing table for guiding the data packets to reach the destination port;
   a second switch configured to receive the data packets forwarded from the fourth switch through the network based on the second routing table, the data packets being queued in a transmission queue to be transmitted via a first transmit port to the destination port, and configured to activate a redundant port profile, after the first transmit port is offline, to requeue the data packets in a mirror queue as redirect packets with a redundant path header and forward the data packets to the fifth switch based on the redundant path header; and
   a third switch configured to receive the redirect packets from the fifth switch based on the third routing table, the third switch comprising a second transmit port configured to transmit the redirect packets to the destination port.

9. The network of claim 8, wherein the second switch comprises a control plane software implemented in an application specific integrated circuit to propagate information of the first transmit port being at the offline state to all switches in the network and command to stop data packet transmission from the first transmit port to the destination port.

10. The network of claim 9, wherein at least the fourth switch comprises a control plane software configured to, upon receiving the information of the first transmit port being offline, update the second routing table to not further forward data packets destined to the destination port to the first transmit port of the second switch.

11. The network of claim 8, wherein the third switch comprises a control plane software implemented in an application specific integrated circuit to check the redundant path header to identify the redirect packets being forwarded from the second switch with the first transmit port being offline, to remove the redundant path header while submitting the redirect packets as data packets in a transmission queue to the second transmit port, and to transmit the data packets to the destination port.

12. A non-transitory computer-readable medium storing instructions that, when executed by one or more processors of a network system, cause the network system to perform operations comprising:
   receiving data packets by a first switch in the network from an initiator;
   forwarding the data packets through the network to a first transmit port in a second switch, the data packets being in a transmission queue to be transmitted to a destination port, using a first routing table of the first switch to forward the data packets to at least a fourth switch having a second routing table to further guide forwarding the data packets to the first transmit port in the second switch;
   detecting an offline state at the first transmit port;
   activating packet redirection mode with a redundant port profile at the first transmit port, the redundant port profile being prepopulated with routing information for redirecting the data packets in the transmission queue through a redundant path to the destination port via a second transmit port in a third switch;

requeuing the data packets as redirect packets in a mirror queue with a header having the redundant path;
forwarding the redirect packets in the mirror queue through the network via the redundant path to the second transmit port;
identifying the redirected packets by the second transmit port based on the header;
removing the header of the redirected packets; and
transmitting the redirected packets from the second transmit port to the destination port.

* * * * *